United States Patent [19]

Spitz

[11] 4,313,665
[45] Feb. 2, 1982

[54] METHOD AND APPARATUS FOR PROJECTOR SUPPORT

[76] Inventor: Jerold B. Spitz, 9 G Talcott Glen Rd., Farmington, Conn. 06032

[21] Appl. No.: 180,635

[22] Filed: Aug. 25, 1980

[51] Int. Cl.³ .................... G03B 17/00; F16M 11/12; A47B 19/00
[52] U.S. Cl. .................... 354/293; 248/183; 248/441 R
[58] Field of Search .................... 248/459, 461, 441 R, 248/183, 184; 352/243; 354/81, 293; 355/39

[56] References Cited

U.S. PATENT DOCUMENTS

| | | | |
|---|---|---|---|
| D. 150,504 | 8/1948 | Kinnard | 248/183 UX |
| D. 179,828 | 3/1957 | Welt | 248/183 UX |
| 439,098 | 10/1890 | Blake | 248/183 |
| 821,335 | 5/1906 | Butler | 248/183 UX |
| 1,796,578 | 3/1931 | O'Reilly | 352/243 X |
| 2,007,215 | 7/1935 | Remey | 352/243 X |
| 2,132,520 | 10/1938 | Taylor et al. | 248/183 UX |
| 2,182,703 | 12/1939 | Rainwater | 248/441 UX |
| 2,214,516 | 9/1940 | Vernon | 248/183 |
| 2,492,807 | 12/1949 | Marcus et al. | 352/243 X |
| 2,586,721 | 2/1952 | Rubin | 248/183 |
| 2,667,110 | 1/1954 | Youtcheff | 354/293 UX |
| 2,922,609 | 1/1960 | Collier | 354/293 X |
| 2,935,006 | 5/1960 | Everetts | 354/293 |
| 2,976,791 | 3/1961 | Larsson | 352/243 X |
| 3,006,052 | 10/1961 | Stickney et al. | 354/293 X |
| 3,137,532 | 6/1964 | Tyll | 354/293 X |
| 3,273,484 | 9/1966 | Lapsley | 352/243 X |
| 3,452,663 | 7/1969 | Machtig | 352/243 X |
| 3,784,302 | 2/1974 | Carpenter | 248/183 |
| 3,805,281 | 4/1974 | Narita et al. | 354/81 |
| 3,821,771 | 6/1974 | Johnson et al. | 352/243 X |
| 3,913,877 | 10/1975 | Wiener | 248/441 R X |
| 4,068,248 | 1/1978 | Pizzuti et al. | 354/288 |
| 4,073,460 | 2/1978 | Dale | 248/441 R |

*Primary Examiner*—Donald A. Griffin

[57] ABSTRACT

A projector mount includes a planar base surface and upstanding sidewalls extending from the sides of the base. The lower surface has a threaded aperture that can receive the screw of a tripod, and the projector can fit on the upper surface of the base. Consequently, the mount adapts the tripod for use with the projector. In the absence of the tripod, the mount can be inverted so that the upper edges of the sidewalls are disposed on an appropriate support surface. The projector can then rest on the lower surface of the base portion. A removable cover permits the mount to be used as a carrying case.

19 Claims, 10 Drawing Figures

METHOD AND APPARATUS FOR PROJECTOR SUPPORT

BACKGROUND OF THE INVENTION

The present invention is directed to a mount for a projector.

When slides or movies are to be shown in homes, meeting rooms, and other places not specifically intended for the purpose, a chair, a coffee table, or similar piece of furniture is typically pressed into service as the stand for the projector. Often several books or magazines are also used to achieve the correct height, since the table or chair often provides too low a surface. This arrangement is often inconvenient, and the perch of the projector on the resultant "stand" is often precarious.

It is accordingly an object of the present invention to provide a convenient support for a projector. It is another object to achieve this by means of a mount that can be used with a tripod or the like as well as available furniture. A further object is to provide these features in an apparatus that can double as a carrying case.

SUMMARY OF THE INVENTION

The foregoing and related objects are achieved in a mount for a projector. The mount includes a generally planar base portion and at least a pair of upstanding sidewall portions on opposite sides of the base portion. The base portion has mounting means on its lower surface including a threaded aperture for seating the screw of an associated tripod or the like, and the wall portions extend along at least a major portion of the length of the opposed sides. The base and wall portions are dimensioned and configured for support of an associated projector on the upper surface of the base portion between the walls when the mount is supported on the associated tripod. The mount is invertible to dispose the upper edges of the sidewall portions on a generally horizontal planar support surface to support the base portion above the support surface and thereby enable the mount to support the associated projector above the support surface.

One of the upstanding walls may conveniently be made shorter than the other to incline the base portion by at least about 2° when the upper edges of the sidewall portions are disposed on the generally horizontal support surface. In one illustrated embodiment, the mount further includes a third upstanding wall portion extending at least a portion of the way along an end of the base portion extending between the sides of the base portion. In another, the sidewall portions are dimensioned and configured to enable one of them to support the projector on the outer surface of the one sidewall portion when the outer surface of the other sidewall is disposed on the generally horizontal support surface. The mount may include at least one elongated strut member extending between the sidewall portions near their upper edges. The strut member would be removably attached to the sidewalls at the ends of the strut member for support of the one sidewall portion when the associated projector rests on its outer surface. The mount may also include a cover member removably secured to at least one of the base and sidewall portions. The cover would be dimensioned and configured to enclose the associated projector between the cover and the base and sidewall portions. Such a mount could conveniently provide an aperture through it sized and positioned to permit the handle of an associated projector disposed within the mount to protrude through the aperture for grasping from outside the mount by a human hand. At least three elongated leg members may be added; each leg member is removably attached at its one end to the mount base portion and extends from its lower surface for support of the mount above the horizontal support surface when the other end of each leg member rests on the horizontal support surface.

The advantages of the invention are also realized in the combination of the mount and a projector. Related objects are achieved in a method of supporting a projector that includes the step of providing the mount previously described, inverting it and disposing the upper edges of the sidewall portions on a generally horizontal planar support surface to support the base portion above the support surface, and placing a projector on the lower surface of the base portion of the mount. The mount thereby supports the projector above the horizontal support surface.

The threaded aperture of the mounting means may seat the screw of an associated tripod for support of the mount by the tripod, and the method would further include the step of removing the mount from the tripod before inverting it. When the version of the mount is used in which one of the sidewall portions is shorter than the other to incline the base portion by at least 2°, the step of placing the projector on the base portion thereby includes the step of inclining the projector. The description below also discloses a method of supporting a projector that includes the step of providing a mount including a generally planar base portion having mounting means on its lower surface including a threaded aperture for seating the screw of an associated tripod or the like. The mount further includes at least a pair of upstanding sidewall portions on opposite sides of the base portion and extending along at least a major portion of the length of the opposed sides. The base and wall portions are dimensioned and configured for support of an associated projector on the upper face of the base portion between the walls when the mount is supported on the associated tripod, and the wall portions are dimensioned and configured to enable one of them to support the associated projector on its outer surface when the outer surface of the other sidewall is disposed on the generally horizontal support surface. The method also includes disposing the outer surface of the other sidewall on the generally horizontal support surface and placing a projector on the outer surface of the one sidewall portion. The mount thereby supports the projector above the horizontal surface.

This method may also include the steps of providing at least one elongated strut member whose length is approximately equal to the distance between the sidewall portions, the strut member being adapted to be removably attached at its ends to the sidewalls near their upper edges, and removably attaching the strut member at its ends to the sidewall near its upper edges for support of the one sidewall when the projector rests on it.

BRIEF DESCRIPTION OF THE DRAWINGS

These and further features and advantages of the present invention are described in connection with the accompanying drawings, in which.

DETAILED DESCRIPTION OF THE PREFERRED EMBODIMENT

Figure 3:
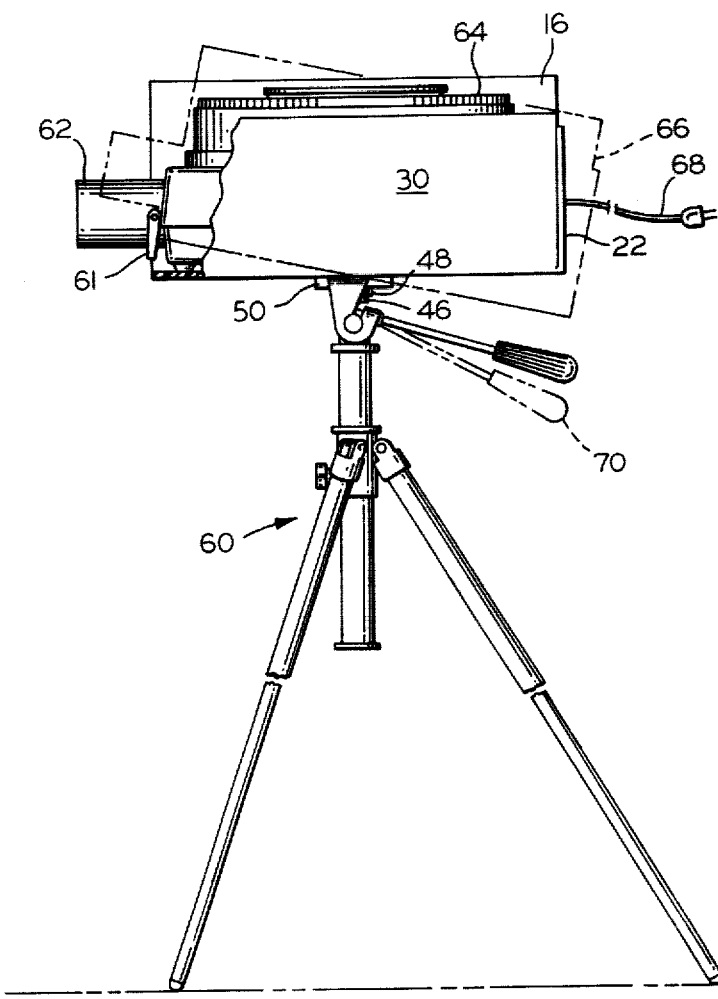
FIG. 3 is a side elevation of the mount in position on a tripod and carrying a projector.
Figure 6:
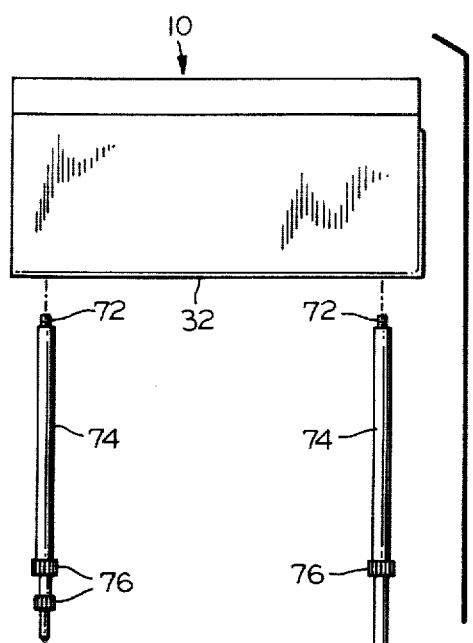
FIG. 6 is a side elevation of the projector mount illustrating the removable legs.
Figure 5:
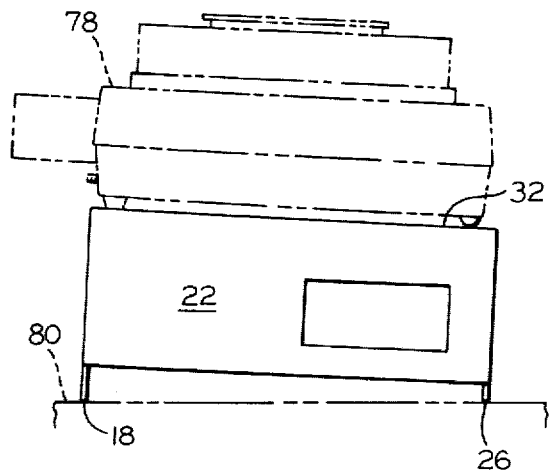
FIG. 5 is a side elevation of the projector mount in its inverted position.
Figure 7:
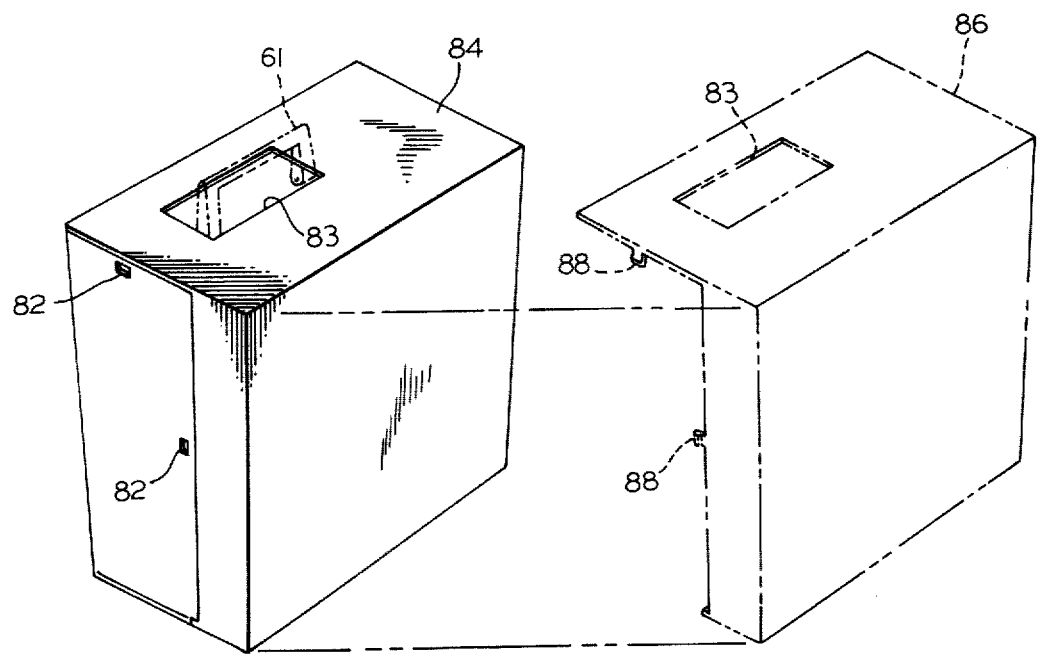
FIG. 7 is a perspective view of the mount including the removable cover.
Figure 9:
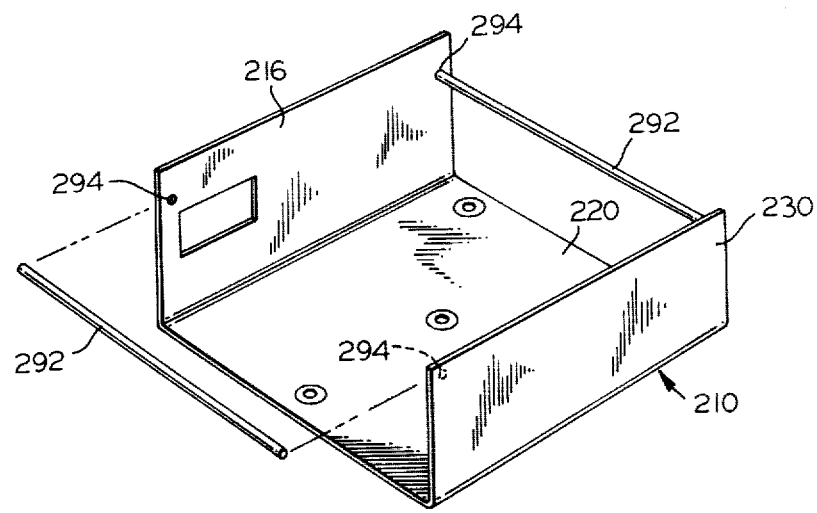
FIG. 9 is a perspective view of another alternate version.
Figure 10:
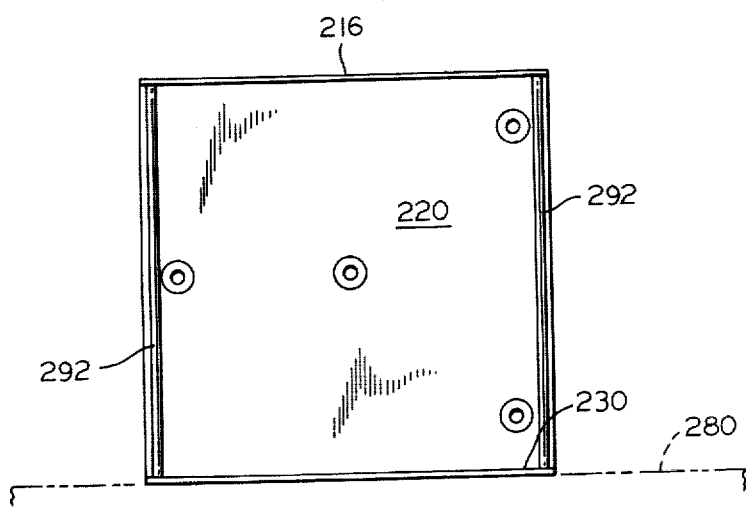
FIG. 10 is a side elevation of the mount of FIG. 9.

The accompanying drawings illustrate a novel projector mount that can be used to avoid the inconvenience heretofore encountered in home viewing of slides and movies. The mount of FIG. 1 can be used with a tripod as illustrated in FIG. 3 to provide a ready and easily adjustable support for the projector. In addition to its use with the tripod, the mount of FIG. 1 can be inverted as illustrated in FIG. 5 to provide additional elevation when, for instance, a table is employed as a supporting surface. Further height can be obtained through the use of removable legs, as FIG. 6 illustrates, and a complementary cover is illustrated in FIG. 7 that can be used to permit the mount to double as a carrying case. An alternate version illustrated in FIG. 8 has the further ability to add an additional available height by setting the mount on its end wall, while FIGS. 9 and 10 depict a version that can be used to support the projector on one of the sidewalls.

Figure 1:
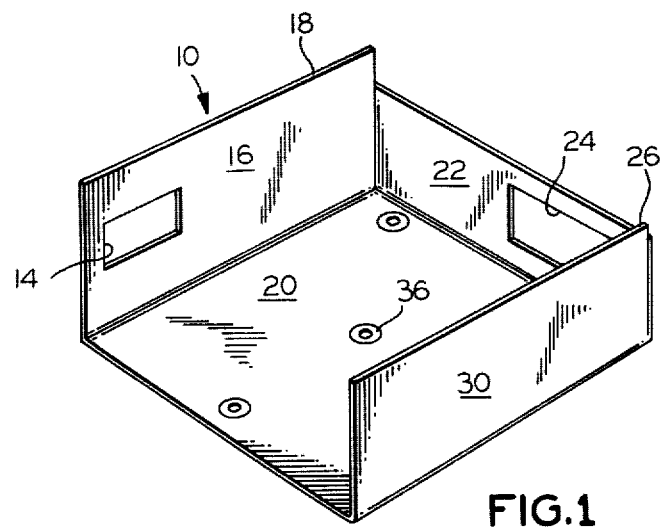
FIG. 1 is a perspective view of the projector mount of the present invention.

FIG. 1 illustrates the mount 10 of the present invention, which includes a base portion whose upper surface 20 is illustrated in FIG. 1. (The terms *upper, lower, top,* etc. will refer throughout the application to the orientation in FIG. 1, although the "upper" surface will be on the bottom when the mount is inverted.) Sidewall portions 16 and 30 extend upward from opposite sides of the base portion, and an end wall 22 extends upward from an end margin of the base portion.

The walls would typically be provided with appropriate openings such as opening 14 in sidewall 16 and opening 24 in end wall 22. Opening 14 may be provided, for instance, to provide access to the controls on a projector that would rest on surface 20 between sidewalls 16 and 30. Opening 24 might provide ventilation and accommodate a power cord. Depending on the projector to be supported, other openings may also be provided in the walls.

Clearly, the material to be used in constructing the mount is not critical. It is only necessary that the material be strong enough to withstand the stresses encountered in supporting the associated projector on a tripod. Models have been formed from sheets of a transparent methyl methacrylate polymer sold under the name PLEXIGLAS, but other suitable materials could also be employed.

Figure 2:
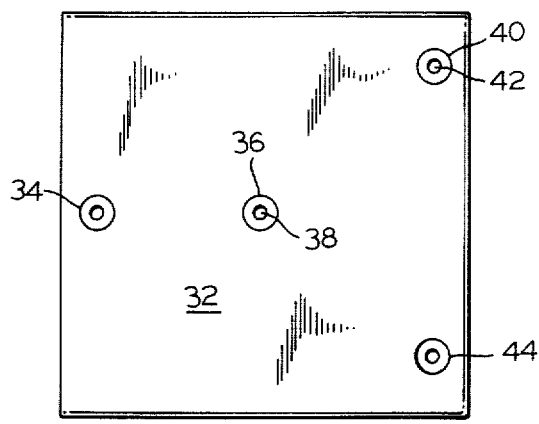
FIG. 2 is a bottom view of the mount of FIG. 1.
Figure 4:
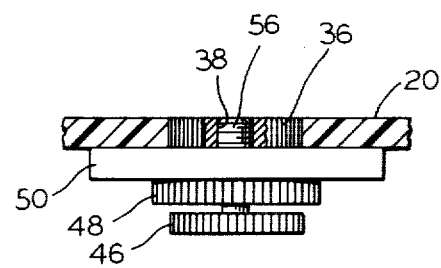
FIG. 4 is a partly sectional view with parts removed showing in detail the mounting means for mounting the mount on the tripod.

FIGS. 2, 3, and 4 illustrate the manner in which the mount is supported on a tripod. As FIG. 2 illustrates, a mounting means is provided on the lower surface 32 of the base portion. It includes a metal insert 36 having a threaded aperture 38. A screw 56 (FIG. 4) provided at the top of tripod 60 (FIG. 3) is seated in threaded aperture 38 to attach the mount to tripod 60. As FIG. 4 illustrates, a plate member 50 of the tripod abuts the base portion of the mount, and knobs 46 and 48, conventionally provided on tripod 60, are employed to tighten base portion of mount 10 onto plate member 50.

The mounting means illustrated in the drawings includes an annular metal insert 36 that provides a threaded aperture 38. It is thought that the use of the metal insert is desirable when most plastics are used because the tendency for the plastic threads to wear is typically greater than that for metal threads. But it is also apparent that the entire mount, including the portion providing the threads, could be made of a single material.

With the mount in position on tripod 60, the height of the mount would be adjusted, and the projector 64 would be placed in position to rest on the upper surface 20 of the base portion, as FIG. 3 illustrates. The angle of the projector can also be adjusted, as is suggested by phantom 70 of the adjusting lever and phantom 66 of the tilted position of the mount. It is quite apparent that this type of support is considerably more convenient than the typical chair or table supplemented with books and magazines. Since the owner of the projector will in many cases already own a tripod for use in photographic work, the cost of achieving the convenience of the FIG. 3 arrangement can be limited to the expense of obtaining the mount itself.

Even without a tripod, the mount illustrated in FIG. 1 finds application as a support for a projector. If the mount illustrated in FIG. 1 is inverted as illustrated in FIG. 5, the lower surface 32 of the base portion can provide the support for the projector, suggested by phantom 78 of FIG. 5. The free upper edges 18 and 26 of sidewalls 16 and 30, respectively, can be disposed on a horizontal support surface 80 so that sidewalls 16 and 30 hold the base portion above the support surface, adding the additional height that is typically required when a chair or table is used to support the projector. (Again, the terms *upper* and *lower* refer to the FIG. 1 orientation.) In the illustrated embodiment, sidewall 30 is shorter than sidewall 16, and this provides an inclination to the surface 32 on which the projector rests. The projector itself will often have adjustable feet to provide some amount of inclination, but it has often been found in practice that additional inclination is necessary. Thus, the difference in height between the two sidewalls is considered desirable. Of course, if it is desired for the projector to be completely level, the projector can be aimed to the right in FIG. 5, and the adjustable leg of the projector can be used to raise the front of the projector to a level position. The inclination illustrated in FIG. 5 is approximately 3°, which is considered a convenient inclination, although greater angles may also be found desirable. It is thought that the angle should be at least about 2° to make provision of an inclination worthwhile.

From the description thus far, it is apparent that the mount of FIG. 1 is quite versatile. When the mount is used in conjunction with a tripod, virtually any height or angle that is desired can be achieved with a minimum of effort and cost. Furthermore, in those instances in which a chair or table is conveniently located or a tripod is unavailable, mount 10 eliminates a need for using numbers of books or magazines to achieve added height. In addition, the illustrated mount can be used to provide the additional inclination often desired without the necessity for employing makeshift and often precarious expedients.

One way of adding to the advantages already described is to supplement the basic mount with the adjustable, removable legs 74 shown in FIG. 6. These can be provided to increase the range of heights that can be achieved in the absence of a tripod. As FIG. 2 indicates, further metal inserts 34, 40, and 44 are typically included in the lower surface 32 of the base portion of mount 10. Each is provided with a threaded aperture such as aperture 42 of FIG. 2 for receiving the threaded tips 72 of legs 74. The legs can be of any appropriate design, the ones in FIG. 6 being illustrated as having conventional knurled adjustment knobs 76 for loosening and tightening the telescoping segments of legs 74. Thus, with little additional equipment, the versatility of the mount without a tripod can be significantly enhanced.

The associated projector will often include a handle such as handle 61. With the cylindrical lens casing 62 retracted or removed, the projector can be conveniently carried by grasping the handle. However, other equipment such as extra slides, extension cords, and so on must be carried separately. With the inclusion of a complementary cover such as that illustrated in FIG. 7, the mount of the present invention can double as a carrying case for the projector and the additional equipment. Cover 84 is formed complementary in shape to the rest of the mount so that it provides an internal cavity sized to enclose the projector with room for the extra equipment.

An opening 83 is provided in cover 84 and is positioned to permit the handle 61 of the associated projector to protrude through it and be grasped conveniently by a human hand. In this arrangement, the carrying case does not bear the weight of the projector but only carries the extra equipment contained inside. As a result, the means for connecting cover 84 to the rest of the mount 10 need not be particularly strong, and it is illustrated in FIG. 7 as merely being provided by apertures 82 in sidewall 30 and cooperating tabs 88 on phantom 86 of the carrying-case cover 84.

The arrangement of FIG. 7 is particularly convenient when the mount is used with the tripod because the tripod can act as a stand while miscellaneous extra equipment is placed in the mount. All appropriate preparations can be made, equipment stowed, and the cover 84 snapped into place while the projector and mount remain on the tripod. Once the projector, mount, and equipment have been secured into a convenient package, the connection to the tripod can be released and the projector and related equipment carried away.

Figure 8:
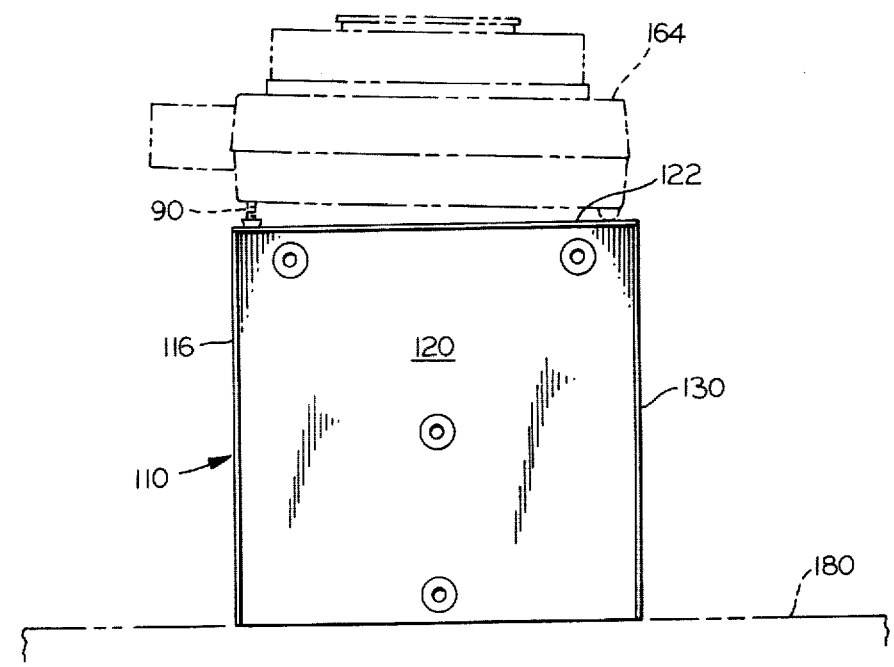
FIG. 8 is a side elevation of an alternate version of the mount resting on its end wall.

An alternate embodiment of the mount of the present invention is illustrated in FIG. 8. Mount 110 of FIG. 8 includes a planar base portion having an upper surface 120 corresponding to surface 20 of mount 10. It also includes sidewalls 116 and 130 and end wall 122 corresponding to side and end walls 16, 30, and 22, respectively, of FIG. 1.

FIG. 8 shows mount 110 on one end, resting on the end edges of sidewalls 116 and 130. In this position, the end wall 122 can provide the supporting surface for the associated projector, suggested in FIG. 8 by phantom 164. To facilitate this arrangement, mount 110 of FIG. 8 differs from mount 10 of FIG. 1 in that its walls are higher than the walls in FIG. 1. The extra size of wall 122 provides the surface required to support the feet of projector, while the greater dimension of the other walls can provide extra stability if this is considered desirable. With this version of the mount, two elevations are provided, the elevation afforded by inverting the mount and the elevation that results from setting it on its end. The orientation shown in FIG. 8 provides no inclination, so the adjustable foot 90 of the associated projector is illustrated.

A design that is thought to be somewhat more simple to form from a plastic sheet is illustrated in FIGS. 9 and 10. It will be noted that parts corresponding to those in FIG. 1 have corresponding numbers; sidewall 16 of FIG. 1 corresponds to sidewall 216 of FIG. 9, for instance, and the upper surface 220 of the base portion in FIG. 9 corresponds to upper surface 20 of FIG. 1. FIG. 9 differs from FIG. 1 mainly in the absence of an end wall and in the provision of horizontally extending struts 292 and detents 294 for removably attaching the ends of the struts to the sidewalls. The material making up the mount would typically be resiliently deformable to some extent so that sidewalls 216 and 230 could be separated slightly to allow the ends of struts 292 to snap into place in detents 294.

Struts 292 are employed predominantly when mount 210 is oriented in the position of FIG. 10, in which it is shown lying on the outer surface of sidewall 230. In this position, sidewall 216 is oriented to permit its outer surface to support a projector. To contribute to support of the projector when the orientation in FIG. 10 is employed, struts 292 are inserted to prevent sidewall 216 from bending inwardly under the weight of the projector.

There may be instances in which the height of sidewall 216 may not be great enough to enable it to support a relatively wide projector by its feet. In such instances, the widely spaced feet could straddle sidewall 216, which would thus support the projector by its lower surface rather than by its feet. Narrower projectors could be supported by their feet, and the height of sidewall 216 could, of course, be increased if it is desired to support wider projectors by their feet.

When the FIG. 9 orientation is employed, one or both of the struts can be removed to permit the projector to be placed in position on surface 220 of the base portion. It may be found convenient to leave rear strut 292 in position when the FIG. 9 orientation is used, because the projector can be easily set into place without removal of both struts. Additionally, the presence of rear strut 292 will prevent the projector from sliding rearwardly if the mount is pivoted excessively while mounted on the tripod.

From the preceding discussion, it is apparent that a long-felt need has been met by a device that is both simple and versatile as well as inexpensive. It can be used with a tripod to provide a wide range of elevations and angles. In the absence of a tripod, it provides added elevation in a manner that is more convenient than the typical telephone book or stack of magazines. With the simple addition of legs, a greater range of elevations is afforded with very little increase in complexity, and the mount is so arranged that it is easily augmented to provide a carrying case for auxiliary equipment.

Having thus described the invention, I claim:

1. The combination of a projector and mount comprising:
    a. a projector operable to project an image on a remote surface; and
    b. a mount supporting said projector and including a generally planar base portion having mounting means on its lower surface including a threaded aperture for seating the screw of an associated tripod or the like to support said mount on the associated tripod, said mount further including at least a pair of sidewall portions on opposite sides of said base portion and extending in the same generally vertical direction therefrom along at least a major portion of the length of said opposite sides, said projector resting on the upper surface of said base portion, said mount being dimensioned and configured for disposition of said remote edges of said sidewall portions on a generally horizontal planar support surface to support said base portion above the support surface and thereby enable said mount to support said projector above the support surface when said mount is not supported on the associated tripod.

2. The combination of claim 1 wherein one of said sidewall portions is shorter than the other to incline said base portion by at least about 2° when said remote edges of said sidewall portions are disposed on the generally horizontal support surface.

3. The combination of claim 1 wherein said mount further includes a third generally vertical wall portion extending at least a portion of the way along an end of said base portion extending between said sides of said base portion.

4. The combination of claim 1 wherein said sidewall portions are dimensioned and configured to enable one of them to support said projector on the outer surface of said one sidewall portion when the outer surface of the other sidewall is disposed on the generally horizontal support surface.

5. The combination of claim 1 further including at least three elongated leg members, each leg member being removably attached at one end thereof to said mount base portion and extending from said lower surface thereof for support of said mount and projector above the horizontal support surface when the other end of each of said leg members rests on the horizontal support surface.

6. The combination of claim 1 further including a cover member removably secured to at least one of said base and sidewall portions and enclosing said projector between said cover and said base and sidewall portions.

7. A mount for a projector comprising:
a. a generally planar base portion having mounting means on its lower surface including a threaded aperture for seating the screw of an associated tripod or the like to support said mount on the associated tripod; and
b. at least a pair of sidewall portions on opposite sides of said base portion and extending in the same generally vertical direction therefrom along at least a major portion of the length of the opposed sides and providing generally horizontal edges remote from said base portion, said base portion being dimensioned and configured for support of an associated projector on the upper surface of said base portion when said mount is supported on the associated tripod, said remote edges of said sidewall portions being configured for disposition on a generally horizontal planar support surface to support said base portion above the support surface and thereby enable said mount to support the associated projector above the support surface.

8. The projector mount of claim 7 wherein one of said sidewall portions is shorter than the other to incline said base portion by at least about 2° when the remote edges of said sidewall portions are disposed on the generally horizontal support surface.

9. The projector mount of claim 7 wherein said mount further includes a third generally vertical wall portion extending at least a portion of the way along an end of said base portion extending between said sides of said base portion.

10. The projector mount of claim 7 wherein said wall portions are dimensioned and configured to enable one of them to support said projector on the outer surface of said one sidewall portion when the outer surface of the other sidewall is disposed on the generally horizontal support surface.

11. The projector mount of claim 7 further including a cover member removably secured to at least one of said base and sidewall portions and being dimensioned and configured to enclose the associated projector between said cover and said base and sidewall portions.

12. The projector mount of claim 7 further including at least three elongated leg members, each of said leg members being removably attached at one end thereof to said base portion of said mount and extending from said lower surface thereof for support of said mount above the horizontal support surface when the other end of each of said leg members rests on the horizontal support surface.

13. A method of supporting a projector comprising the steps of:
a. providing a mount including a generally planar base portion having mounting means at its lower surface including a threaded aperture for seating the screw of an associated tripod or the like to support said mount on the associated tripod, said mount further including at least a pair of upstanding sidewall portions on opposite sides of said base portion and extending along at least a major portion of the length of the opposed sides, said base and wall portions being dimensioned and configured for support of an associated projector on the upper surface of said base portion between said walls when said mount is supported on the associated tripod;
b. inverting said mount and disposing the upper edges of said sidewall portions on a generally horizontal planar support surface to support said base portion above said support surface; and
c. placing a projector on the lower surface of said base portion of said mount, said mount thereby supporting said projector above said horizontal support surface.

14. The method of claim 13 wherein said threaded aperture of said mounting means seats the screw of an associated tripod for support of said mount by said tripod and wherein said method further includes the step of removing said mount from said tripod before inverting said mount.

15. The method of claim 13 wherein one of said sidewall portions is shorter than the other to incline said base portion by at least 2°, said step of placing said projector on said base portion thereby including the step of inclining said projector.

16. A method of supporting a projector comprising the steps of:
a. providing a mount including a generally planar base portion having mounting means on its lower surface including a threaded aperture for seating the screw of an associated tripod or the like to support said mount on the associated tripod, said mount further including at least a pair of sidewall portions on opposite sides of said base portion and extending in the same generally vertical direction therefrom along at least a major portion of the length of the opposed sides to provide generally horizontal edges remote from said base portion, said base portion being dimensioned and configured for support of an associated projector on the upper surface of said base portion when said mount is supported on the associated tripod, said sidewall portions being dimensioned and configured to enable one of them to support the associated projector on its outer surface when the outer surface of the other sidewall is disposed on the generally horizontal support surface;

b. disposing said outer surface of said other sidewall on the generally horizontal support surface; and c. placing a projector on the outer surface of said one sidewall portion, said mount thereby supporting said projector above said horizontal surface.

17. A mount for a projector comprising:

a. a generally planar base portion having mounting means on its lower surface including a threaded aperture for seating the screw of an associated tripod or the like to support said mount on the associated tripod;

b. at least a pair of sidewall portions on opposite sides of said base portion and extending in the same generally vertical direction therefrom along at least a major portion of the length of the opposed sides and providing generally horizontal edges remote from said base portion, said base being dimensioned and configured for support of an associated projector on the upper surface of said base portion when said mount is supported on the associated tripod, said remote edges of said sidewall portions being configured for disposition on a generally horizontal planar support surface to support said base portion above the support surface and thereby enable said mount to support the associated projector above the support surface, said sidewall portions being dimensioned and configured to enable one of them to support said projector on the outer surface of said one sidewall portion when the outer surface of the other sidewall portion is disposed on the generally horizontal support surface; and c. at least one elongated strut member extending between said sidewall portions near the remote edges thereof and removably attached thereto at the ends of said strut member for support of said one sidewall portion when the associated projector rests on the outer surface thereof.

18. A mount for a projector comprising:

a. a generally planar base portion having mounting means on its lower surface including a threaded aperture for seating the screw of an associated tripod or the like to support said mount on the associated tripod;

b. at least a pair of sidewall portions on opposite sides of said base portion and extending in the same generally vertical direction therefrom along at least a major portion of the length of the opposed sides to provide generally horizontal edges remote from said base portion, said base portion being dimensioned and configured for support of an associated projector on the upper surface of said base portion when said mount is supported on the associated tripod, said remote edges of said sidewall portions being configured for disposition on a generally planar support surface to support said base portion above the support surface and thereby enable said mount to support the associated projector above the support surface; and c. a cover member removably secured to at least one of said base and sidewall portions and being dimensioned and configured to enclose the associated projector between said cover and said base and sidewall portions, said mount further providing an aperture therethrough sized and positioned to permit the handle of an associated projector disposed within said mount to protrude through said aperture for grasping from outside said mount by a human hand.

19. A method of supporting a projector comprising the steps of:

a. providing a mount including a generally planar base portion having mounting means on its lower surface including a threaded aperture for seating the screw of an associated tripod or the like to support said mount on the associated tripod, said mount further including at least a pair of sidewall portions on opposite sides of said base portion and extending in the same generally vertical direction therefrom along at least a major portion of the length of the opposed sides to provide generally horizontal edges remote from said base portion, said base portion being dimensioned and configured for support of an associated projector on the upper surface of said base portion when said mount is supported on the associated tripod, said sidewall portions being dimensioned and configured to enable one of them to support the associated projector on its outer surface when the outer surface of the other sidewall is disposed on the generally horizontal support surface;

b. disposing said outer surface of said other sidewall on the generally horizontal support surface;

c. providing at least one elongated strut member whose length is approximately equal to the distance between said sidewall portions, said strut member being adapted to be removably attached at its ends to said sidewalls near said remote edges thereof;

d. removably attaching said strut member at its ends to said sidewall portion near said remote edges thereof for support of said one sidewall portion when said projector rests thereon; and e. placing a projector on said outer surface of said one sidewall portion, said mount thereby supporting said projector above said horizontal surface.

* * * * *